Aug. 31, 1926.

L. KIRSCHMANN 1,598,085

APPARATUS FOR HEATING AND COOLING VICTUALS OR BEVERAGES

Filed April 21, 1925

Patented Aug. 31, 1926.

1,598,085

UNITED STATES PATENT OFFICE.

LEOPOLD KIRSCHMANN, OF BERLIN, GERMANY.

APPARATUS FOR HEATING AND COOLING VICTUALS OR BEVERAGES.

Application filed April 21, 1925, Serial No. 24,897, and in Germany March 24, 1925.

This invention relates to a vessel to be inserted into a Dewar's vacuum vessel and designed to heat or cool victuals or beverages, the degree of heating or cooling being regulated at will.

The insertion vessel is made of a special kind of glass or other convenient material which is capable to withstand sudden variations of temperature up to 50°.

Several embodiments of the invention are shown, by way of example, in the accompanying drawing in which Fig. 1 shows the insertion vessel of prefered form in vertical section.

Figure 1:
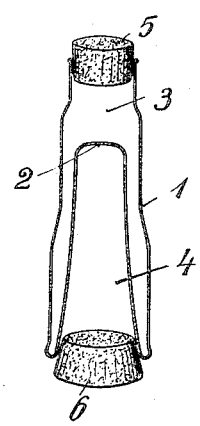

The insertion vessel 1 as shown in Fig. 1, which is made from glass, is of elongated shape open at the neck and its bottom wall 2 is bulged inward and upward so that an outer space 3 and an inner space 4 are formed, said two spaces being separated the one from the other. The inner space 4 is designed to receive the victuals or beverage to be heated or cooled and the outer space 3 is filled with the chemicals designed to produce the heat or cold. The neck of the vessel is closed by a stopper 5 and the open end of the inner space 4 is closed by a stopper 6.

When the victuals or beverage stored in space 4 are to be heated phosphate of lime or chlorid of calcium or metallic calcium is filled into the space 3 whereupon water is added. The heat generated acts upon the contents of the space 4.

If the contents of space 4 have to be cooled a freezing mixture, for instance ammonium nitrate and crystals of sodium carbonate, is filled into the outer space 3, so that a low temperature beyond the freezing temperature can be produced in space 4.

Figure 4:
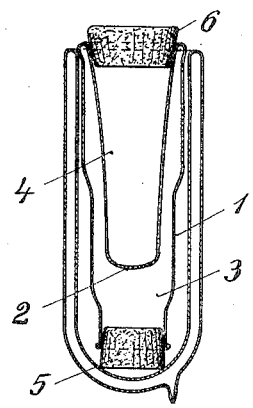
Fig. 4 shows in vertical section a Dewar's vacuum vessel with the insertion vessel as shown in Fig. 1.

In order to prevent loss of heat or cold by radiation the insertion vessel is inserted, as shown in Fig. 4 in a Dewar's vacuum vessel.

With the aid of this apparatus victuals or beverages can be heated or cooled or even frozen without the aid of fire or ice. The apparatus can be used in households as well as in the open air, in railway compartments or under all prevailing circumstances. As the two spaces are separated the one from the other and the open ends of the spaces are situated at opposite sides of the vessel it is impossible that the chemicals in the outer space come in contact or admix with the contents of the inner space.

Figure 2:
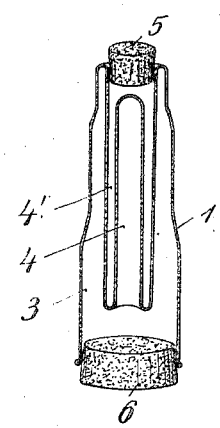
Fig. 2 shows in vertical section of an insertion vessel of modified construction.

In Fig. 2 a modified construction of the insertion vessel 1 is shown. The open end of the vessel 1 is at the bottom and the wall is bent down at the top end to reach nearly to the bottom end and bent up again so that two inner spaces 4 and 4' are formed. The opening at the top end is closed by a stopper 5 and the opening at the bottom end is closed by a stopper 6. In this insertion vessel the victuals or beverage to be cooled are filled through the open bottom end into the outer space 3 and the inner space 4, and the chemicals for producing heat or the freezing mixture is filled into the inner space 4' through the opening at the top end. The outer space 3 and inner space 4 are separated from the inner space 4' so that the contents of space 4' cannot mix with the contents of spaces 4 and 3. The vessel shown in Fig. 2 consists of a single piece of glass and the inner shell which forms the space 4 terminates short of both ends of the outer shell or wall 1. The intermediate shell which is arranged between the inner and outer shells to form the spaces 3 and 4' extends from one end of the inner shell to the opposite end of the outer shell and is connected at its ends to the said shells.

Figure 3:
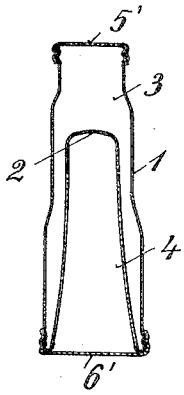
Fig. 3 shows in vertical section the inertion vessel shown in Fig. 1 having screw stoppers.

Instead of the stoppers 5 and 6 shown in Figs. 1 and 3 screw stoppers 5' and 6' as shown in Fig. 3 may be used.

I claim:—

1. An insertion vessel for heating and cooling victuals or beverages to be inserted in a Dewar's vacuum vessel consisting of a single piece of glass and comprising a wall capable of withstanding sudden variations of temperature, said wall being bent to form an open neck, an open bottom end and a plurality of spaces perfectly separated from one another, one of said spaces being designed to receive victuals or beverages to be heated or cooled and the other space designed to receive chemicals which at the addition of water generate heat or a freezing mixture according to whether the insertion vessel is to be used for heating or cooling the contents of one of the spaces, and stoppers removably inserted in the openings of the top and bottom of said vessel and projecting therefrom, one of the stoppers resting upon the bottom of the vacuum vessel and the outer wall at the other end of the vessel being circumferentially enlarged and fitting against the vacuum vessel.

2. An insertion vessel for heating and cooling victuals, and beverages to be inserted in a vacuum vessel, said vessel consisting of a single piece of glass and comprising an outer shell open at one end to receive a stopper, an inner shell extending longitudinally of the outer shell and terminating short of the ends thereof and open at the open end of the outer shell and closed at the other end and an intermediate shell arranged in spaced relation to the inner and outer shells to form intervening spaces and extending from the open end of the inner shell to the opposite end of the outer shell and connected to the said shells, the intermediate shell being extended beyond the closed end of the inner shell and adapted to receive a stopper, said shells comprising several spaces entirely separate, one of the spaces being designed to receive food or beverages to be heated or cooled and the other spaces being designed to receive chemicals which at the addition of water generate heat or a freezing mixture.

In testimony whereof I affix my signature.

LEOPOLD KIRSCHMANN.